(12) United States Patent
Magoshi et al.

(10) Patent No.: US 6,572,114 B1
(45) Date of Patent: Jun. 3, 2003

(54) SEAL RING FOR STEAM TURBINE

(75) Inventors: Ryotaro Magoshi, Takasago (JP); Tetsu Konishi, Takasago (JP); Zenichi Yoshida, Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/623,366

(22) PCT Filed: Feb. 22, 1999

(86) PCT No.: PCT/JP99/00770
§ 371 (c)(1),
(2), (4) Date: Sep. 1, 2000

(87) PCT Pub. No.: WO99/45240
PCT Pub. Date: Sep. 10, 1999

(30) Foreign Application Priority Data

Sep. 22, 1997 (JP) ............................................. 9-256712
Mar. 2, 1998 (JP) ........................................... 10-049440

(51) Int. Cl.⁷ ............................ F16J 15/44; F16J 15/447
(52) U.S. Cl. ....................... 277/411; 277/412; 277/413; 277/416; 277/421
(58) Field of Search ................................ 277/411, 412, 277/413, 416, 421, 422; 403/344

(56) References Cited

U.S. PATENT DOCUMENTS

| 2,279,863 A | * | 4/1942 | Downer ...................... 277/413 |
| 3,610,711 A | * | 10/1971 | Mierley, Sr. ................. 384/311 |
| 3,625,526 A | * | 12/1971 | McCormick | |
| 4,436,311 A | * | 3/1984 | Brandon ...................... 277/413 |
| 4,767,266 A | * | 8/1988 | Holz et al. | |
| 5,395,124 A | * | 3/1995 | Brandon ...................... 277/413 |
| 5,464,226 A | * | 11/1995 | Dalton ......................... 277/412 |
| 5,810,365 A | * | 9/1998 | Brandon et al. ............. 277/416 |
| 5,934,684 A | * | 8/1999 | Brandon et al. ............. 277/421 |
| 5,971,400 A | * | 10/1999 | Turnquist et al. ........... 277/416 |

FOREIGN PATENT DOCUMENTS

| JP | 57-116972 | 7/1982 |
| JP | 60-111004 | 6/1985 |
| JP | 63-3570 | 1/1988 |

* cited by examiner

*Primary Examiner*—Anthony Knight
*Assistant Examiner*—Vishal Patel
(74) *Attorney, Agent, or Firm*—Wenderoth, Lind & Ponack, L.L.P.

(57) ABSTRACT

A seal ring provided between a rotating portion and a fixed portion in a rotating machine of steam turbine and the like is improved to accurately carry out predetermined movement so as to not cause deterioration of sealing performance. The seal ring is split into upper, lower, right side and left side seal ring pieces slidably contacting with each other via split planes with spaces being formed in the respective split planes. Springs are interposed in the spaces for activation in upward and downward directions. The upper and lower seal ring pieces are engaged with seal ring guides and the right side and left side seal ring pieces are engaged with seal ring guides so that all of the seal ring pieces are slidable in the upward and downward directions. Further, on the respective tips of the seal ring guides spaces of the upper seal ring piece and spaces of the lower seal ring piece are formed and springs are provided in the spaces for activation in the upward and downward directions. The respective seal ring pieces are prevented from skirmishing with each other and the upper and lower seal ring pieces move toward the inner side at the time of load so as to make narrower the clearances between seal fins and a corresponding rotor surface.

3 Claims, 3 Drawing Sheets

SEAL RING FOR STEAM TURBINE

BACKGROUND OF THE INVENTION

1. Field of the Invention

The present invention relates to a seal ring provided between a rotating portion and a fixed portion in a rotating machine of a steam turbine and the like.

2. Description of the Prior Art

In a rotating machine of a steam turbine and the like, there is provided a seal fin for sealing between a rotating portion and a fixed portion facing to the rotating portion, for example, between a rotating outer circumferential surface formed by a tip of a moving blade and a blade ring therefor or between an inner circumferential tip surface of a stationary blade and a rotor surface facing thereto, as well as there is provided a seal ring supporting the seal fin.

FIG. 3 is a conceptual view of a representative seal ring in the prior art. In FIG. 3, the seal ring is split into four pieces, upper, lower, right and left, in a circumferential direction thereof, as shown by split pieces 21a, 21b, 21c and 21d. The right and left split pieces 21c and 21d are supported by supporting members 23 and 24, respectively, such that the right and left split pieces 21c and 21d are fixed in the horizontal direction, but movable in the upward and downward directions. Between each of the split pieces 21a, 21b, 21c and 21d, there are interposed springs 22 for activating these split pieces in a parallel direction with a tangent of a rotating circumferential surface of the rotating portion. Thus, not only the split pieces 21c and 21d, but also the split pieces 21a and 21b are movable in the upward and downward directions.

In the prior art seal ring constructed as mentioned above, while spring forces of the springs 22 act in the parallel direction with the tangent of the rotating portion circumferential surface, that is, substantially in the rotating portion circumferential direction, the split pieces 21a, 21b, 21c and 21d of the seal ring move in the upward and downward directions, respectively. That is, while the steam turbine is in operation with load, a high temperature high pressure steam flows around an outer circumference of the seal ring, and by the influence of this steam flow, as well as by the load of its own weight, the seal ring moves up and down, which causes deviations between the spring force direction of the springs 22 and the moving direction of each of the split pieces 21a, 21b, 21c and 21d of the seal ring. Thus, there occurs what is called a skirmish phenomenon of the split pieces in which mutually opposing end faces of the adjacent split pieces 21a, 21b, 21c and 21d deviate from a predetermined locus of movement to make an unusual engagement with each other and a sticking (a phenomenon of mutual biting) of the split pieces is liable to occur.

If such a sticking occurs, a clearance between the rotating portion and the fixed portion becomes large enough to cause a leakage of fluid, such as steam, and there arises a problem of deterioration of the performance.

SUMMARY OF THE INVENTION

In view of the problem in the prior art, it is an object of the present invention to provide a steam turbine seal ring which removes the problem in the prior art by ensuring movements of each portion of the seal ring so as to prevent deterioration of the sealing performance.

In order to attain the object, the present invention provides a steam turbine seal ring that is split into a plurality of seal ring pieces, each having a split plane on a portion so split. Each of the pieces having a seal fin fit on an inner circumferential surface thereof and being slidable in upward and downward directions along the split plane. The seal ring comprises a plurality of springs, each interposed between mutually adjacent ones of the seal ring pieces, for activating the seal ring pieces in the upward and downward directions along the split plane and a plurality of seal ring guides, each engaging with one of the seal ring pieces, for guiding the seal ring pieces in the upward and downward directions.

That is, in the present invention, the seal ring is split into plural pieces along the upward and downward directional split planes and the springs interposed between each of the seal ring pieces activate the seal ring pieces to move slidably in the upward and downward directions along the split planes. In addition thereto, the seal ring guides for guiding the seal ring pieces likewise restrict the seal ring pieces so as to move in the upward and downward directions. Thus, by the construction in which the three factors of the moving direction of the seal ring pieces, the acting direction of the springs and the guiding direction of the seal ring guides coincide with each other, the seal ring pieces move accurately so as not to invite deterioration of the sealing performance and a best suitable seal ring apparatus can be obtained.

Also, the present invention provides a steam turbine seal ring as mentioned above, characterized in that the seal ring pieces include an upper seal ring piece and a lower seal ring piece. A plurality of springs are provided, each interposed between the upper seal ring piece and a portion of the seal ring guides engaging therewith or between the lower seal ring piece and a portion of the seal ring guides engaging therewith, for activating the upper and lower seal ring pieces in the upward and downward directions.

That is, in the present invention, the springs are interposed between the upper seal ring piece or the lower seal ring piece and the seal ring guides engaging therewith for activation in the upward and downward directions. The upper and lower seal ring pieces are thereby in a state restricted by the spring forces between the upper seal ring guides and the lower seal ring guides. When the steam turbine starts to operate with a load in this state, a high temperature, high pressure steam flows around the seal ring pieces to cause a differential pressure and also the seal ring's pieces own weight add thereto, thereby the seal ring pieces tend to move toward the inner side thereof as they are in the state so restricted. Thus, the upper and lower seal ring pieces move toward the inner side thereof against the spring forces and clearances between the upper and lower seal fins provided on the inner circumferential surfaces of the upper and lower seal ring pieces and outer circumferential surface of the rotor corresponding thereto are made narrower so that steam leakage from the upper and lower seal fins is reduced sufficiently, which results in further enhancement of the sealing performance.

DESCRIPTION OF THE PREFERRED EMBODIMENTS

Figure 1:
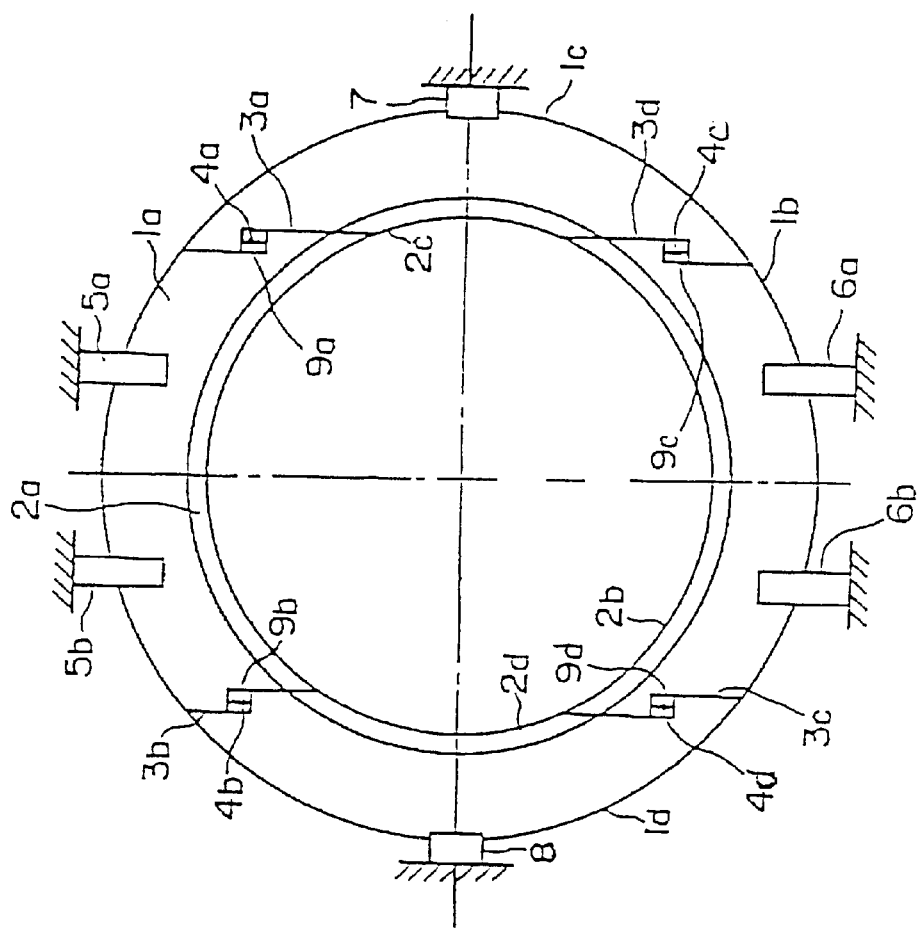
FIG. 1 is a schematic explanatory view showing an axial transverse cross section of a steam turbine seal ring of a first embodiment according to the present invention.

A first embodiment according to the present invention will be described with reference to FIG. 1. FIG. 1 is a schematic explanatory view showing an axial transverse cross section of a steam turbine seal ring of the first embodiment according to the present invention.

In FIG. 1, numeral 1a designates an upper seal ring piece, which is positioned in a range within 45° right and left from a perpendicular passing through an axial center of the seal ring or within 90° upward from the axial center. Numeral 1b designates a lower seal ring piece, which is positioned symmetrical with the upper seal ring piece 1a in a range within 90° downward from the axial center.

Numeral 1c designates a right side seal ring piece and numeral 1d designates a left side seal ring piece. The right side and left side seal ring pieces 1c and 1d, respectively, are positioned in a range within 90° right and left from the axial center, so as to fill the spaces between the upper seal ring piece 1a and the lower seal ring piece 1b.

Each of the mentioned seal ring pieces 1a, 1b, 1c and 1d has a seal fin 2a, 2b, 2c and 2d, respectively, provided on an inner circumferential surface thereof. That is, the upper seal ring piece 1a has an upper seal fin 2a, the lower seal ring piece 1b has a lower seal fin 2b, the right side seal ring piece 1c has a right side seal fin 2c and the left side seal ring piece 1d has a left side seal fin 2d, respectively.

Numeral 3a designates a split plane at which one end face of the upper seal ring piece 1a and that of the right side seal ring piece 1c make contact with or separation from each other, and formation of this split plane 3a will be described with respect to the upper seal ring piece 1a.

That is, the upper seal ring piece 1a has its outer circumferential surface first cut downward in parallel with the perpendicular passing through the axial center. Then, on the way, the cut is turned to the horizontal direction (creating a stepped portion) and is then turned again to the downward direction in parallel with the perpendicular passing to come out of the inner circumferential surface of the upper seal ring piece 1a.

On the other hand, if the split plane 3a is seen with respect to the right side seal ring piece 1c which is in contact with the upper seal ring piece 1a, while the locus of the cut is basically same as the case of the upper seal ring piece 1a, there is a difference in the perpendicular position where the cut is turned to the horizontal direction on the way, so that there is formed a space 9a between the upper seal ring piece 1a and the right side seal ring piece 1c, when they are mated with each other.

As the split plane 3a is formed by the end face of the upper seal ring piece 1a and that of the right side seal ring piece 1c, both configured as mentioned above, the upper seal ring piece I a and the right side seal ring piece 1c are relatively movable in the upward and downward directions with the split plane 3a being a sliding plane there between.

Likewise, numerals 3b, 3c and 3d designate split planes, wherein the split plane 3b is formed between the other end face of the upper seal ring piece 1a and one end face of the left side seal ring piece 1d, the split plane 3c is formed between the other end face of the left side seal ring piece 1d and one end face of the lower seal ring piece 1b and the split plane 3d is formed between the other end face of the lower seal ring piece 1b and the other end face of the right side seal ring piece 1c. Also, numerals 9b, 9c and 9d designate spaces, wherein the space 9b is formed in the portion of the split plane 3b, the space 9c is formed in the portion of the split plane 3c and the space 9d is formed in the portion of the split plane 3d. Construction of the split planes 3b, 3c and 3d and the spaces 9b, 9c and 9d is substantially same as that of the split plane 3a and the space 9a as mentioned above and description thereon will be omitted.

Numeral 4a designates a spring, which is disposed in the space 9a extending in the upward and downward directions for activating the upper seal ring piece 1a and the right side seal ring piece 1c in the same directions along the split plane 3a. It is to be noted that numerals 4b, 4c and 4d likewise designate springs fitted in the spaces 9b, 9c and 9d, respectively, and the construction and function thereof is the same as those of the spring 4a, therefore description thereon will be omitted.

Numerals 5a and 5b designate seal ring guides, respectively, which project downward from an upper fixed portion of a blade ring and the like to engage with the upper seal ring piece 1a, thereby the upper seal ring piece 1a is guided so as to perform upward and downward movements.

Numerals 6a and 6b also designate seal ring guides, respectively, which project upward from a lower fixed portion of the blade ring and the like, opposing the seal ring guides 5a and 5b of the upper position, to engage with the lower seal ring piece 1b, thereby the lower seal ring piece 1b is guided so as to perform upward and downward movements.

Numerals 7 and 8 also designate seal ring guides, respectively, which are provided to a fixed portion opposing each other in the horizontal direction passing through the axial center. The seal ring guide 7 engages with the right side seal ring piece 1c and the seal ring guide 8 engages with the left side seal ring piece 1d, so that the right side seal ring piece 1c and the left side seal ring piece 1d are guided to perform upward and downward movements, respectively.

In the present embodiment of the seal ring constructed as mentioned above, the upper seal ring piece 1a, the lower seal ring piece 1b, the right side seal ring piece 1c and the left side seal ring piece 1d, respectively, are guided by the corresponding seal ring guides 5a and 5b, 6a and 6b, 7 and 8 and are restricted by the corresponding split planes 3a, 3b, 3c and 3d slidably therealong in the upward and downward directions. Moreover, the springs 4a, 4b, 4c and 4d are disposed in the spaces 9a, 9b, 9c and 9d of respective split planes 3a, 3b, 3c and 3d for activation of these seal ring pieces 1a, 1b, 1c and 1d in the upward and downward directions which are the same directions as those of the spring movements. Thereby, a seal ring which is free from occurrences of the mentioned skirmish phenomenon and is able to exhibit a predetermined safe and secure seal function withstanding a differential pressure in each portion in the turbine can be obtained.

Next, a second embodiment according to the present invention will be described with reference to FIG. 2. It is to be noted that reference numerals 1 to 9 in FIG. 2 are for the same parts or components as those of the first embodiment shown in FIG. 1, therefore repeated description thereon will be omitted and featured portions of the present embodiment shown by reference numerals 10a, 10b, 10c and 10d, and 11a, 11b, 11c and 11d will be described in detail.

Figure 2:
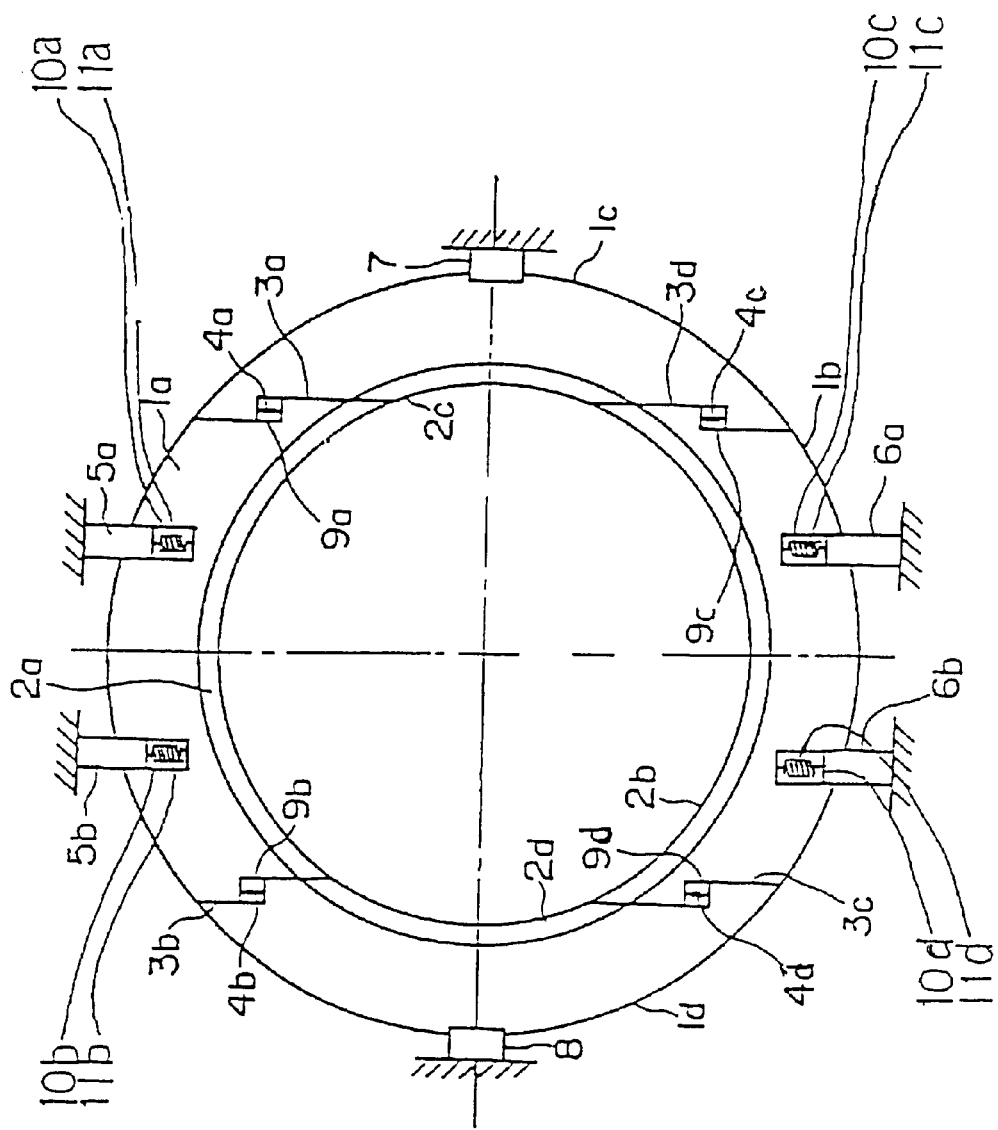
FIG. 2 is a schematic explanatory view showing an axial transverse cross section of a steam turbine seal ring of a second embodiment according to the present invention.
Figure 3:
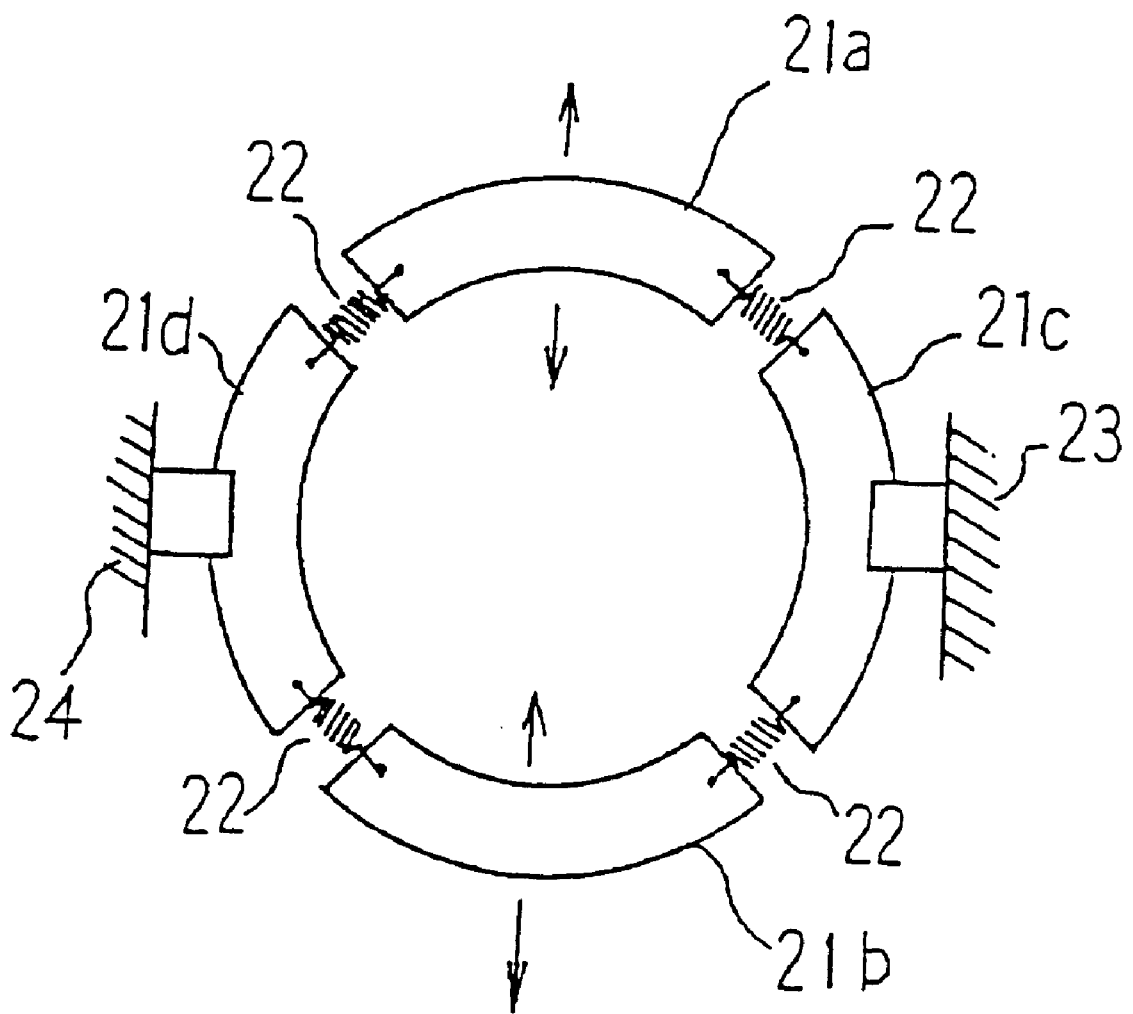
FIG. 3 is a conceptual view of a representative seal ring in the prior art in which seal ring pieces are connected to each other via a spring in the circumferential direction.

In FIG. 2, numerals 10a and 10b designate spaces, respectively, formed to the right and left of the perpendicular passing through the axial center in the upper seal ring piece 1a. The spaces 10a and 10b are made such that grooves with which the seal ring guides 5a and 5b engage are elongated beyond tips of the seal ring guides 5a and 5b so as to form spaces and the seal ring guides 5a and 5b are smoothly slidable up and down along wall surfaces of the spaces 10a and 10b.

Numerals 10c and 10d also designate spaces, respectively, formed to the right and left of the perpendicular passing through the axial center in the lower seal ring piece 1b. The spaces 10c and 10d are likewise made such that grooves with which the seal ring guides 6a and 6b engage are elongated beyond tips of the seal ring guides 6a and 6b so as to form spaces and the seal ring guides 6a and 6b are smoothly slidable up and down along wall surfaces of the spaces 10c and 10d.

Numerals 11a and 11b designate springs inserted into the spaces 10a and 10b, respectively. The springs 11a and 11b are disposed between the tips of the seal ring guides 5a and 5b and bottom planes of the spaces 10a and 10b in the upper seal ring piece 1a so as to activate the upper seal ring piece 1a in the upward and downward directions.

Likewise, numerals 11c and 11d designate springs inserted into the spaces 10c and 10d, respectively. The springs 11c and 11d are disposed between the tips of the seal ring guides 6a and 6b and top planes of the spaces 10c and 10d in the lower seal ring piece 1b so as to activate the lower seal ring piece 1b in the upward and downward directions.

In the present embodiment of the seal ring constructed as mentioned above, the seal ring pieces 1a, 1b, 1c and 1d, respectively, are guided by the corresponding seal ring guides 5a and 5b, 6a and 6b, 7 and 8 and are restricted by corresponding split planes 3a, 3b, 3c and 3d slidably therealong in the upward and downward directions. Moreover, the springs 4a, 4b, 4c and 4d are disposed in the spaces 9a, 9b, 9c and 9d of the respective split planes 3a, 3b, 3c and 3d for activation of the seal ring pieces 1a, 1b, 1c and 1d in the upward and downward directions which are same directions as those of the spring movements, thereby a seal ring which is free from occurrence of the mentioned skirmish phenomenon and is able to exhibit a predetermined safe and secure seal function withstanding a differential pressure in each portion in the turbine can be obtained.

Also, in the present embodiment, the following effect can be obtained in addition to the above.

That is, the springs 11a and 11b are disposed in the spaces 10a and 10b of the upper seal ring piece 1a and the springs 11c and 1d are disposed in the spaces 10c and 10d of the lower seal ring piece 1b. Thus, the upper seal ring piece 1a and the lower seal ring piece 1b, respectively, are in a state restricted by the spring forces between the tips of the seal ring guides 5a and 5b and those of the seal ring guides 6a and 6b via the right side and left side seal ring pieces 1c and 1d.

When a load starts to act in this state, a high temperature high pressure steam flows around each of the seal ring pieces to cause a differential pressure, as well as the seal ring pieces' own weight adding thereto, thereby the seal ring pieces tend to move toward the inner side thereof as they are in the state so mutually restricted. As the result thereof, the upper and lower seal ring pieces 1a and 1b move toward the inner side thereof against the spring forces of the springs 11a and 11b, 11c and 11d, as well as against the spring forces of the springs 4a and 4b, 4c and 4d in the spaces 9a, 9b, 9c and 9d.

Thus, the upper seal fin 2a and the lower seal fin 2b provided on the inner circumferential surfaces of the upper seal ring piece 1a and the lower seal ring piece 1b, respectively, also move toward the inner side, thereby clearances between the upper and lower seal fins 2a and 2b and outer circumferential surface of the rotor corresponding thereto are made narrower, which results in further enhancement of the sealing performance. Further, the spring forces of the springs 11a, 11b, 11c, and 11d are adjusted to such an extent that the upper and lower seal fins 2a and 2b which move correspondingly to differential pressures may not come in contact with the opposing rotor portions.

It is understood that while the invention has been described with respect to the embodiments as illustrated, the invention is not limited thereto but embraces such modified forms thereof that come within the scope of the appended claims.

INDUSTRIAL APPLICABILITY

According to the first embodiment of the present invention, the construction is made such that the seal ring is split into plural pieces along upward and downward directional split planes. Springs interposed between each of the seal ring pieces activate the seal ring pieces to slidably move in the upward and downward directions along the split planes and the seal ring guides for guiding the seal ring pieces likewise restrict the seal ring pieces so as to move in the upward and downward directions. Thus, the three factors of the moving direction of the seal ring pieces, the acting direction of the springs and the guiding direction of the seal ring guides coincide with each other. The seal ring pieces carry out their predetermined actions accurately without skirmishing with each other, and no deterioration of the sealing performance occurs and a best suitable steam turbine seal ring apparatus having safety and reliability can be obtained.

According to the second embodiment of the present invention, in addition to the first embodiment thereof, the construction is made such that springs are interposed between the upper seal ring piece or the lower seal ring piece and the seal ring guides engaging therewith for activation in the upward and downward directions and the upper and lower seal ring pieces are thereby in the state restricted by the spring forces between the upper seal ring guides and the lower seal ring guides. Thus, in addition to the three factors of the moving direction of the seal ring pieces, the acting direction of the springs and the guiding direction of the seal ring guides coincide with each other so as to not cause skirmishing of the seal ring pieces. The upper and lower seal ring pieces move toward the inner side thereof against the spring forces in the steam turbine operation time with load, so that clearances between the upper and lower seal fins and outer circumferential surface of the rotor are made narrower, thereby the sealing performance is further enhanced and an excellent sealing function can be exhibited safely and securely.

What is claimed is:

1. A seal ring comprising:
   a plurality of seal ring pieces, each of said plurality of seal ring pieces having a seal fin located on an inner circumferential surface thereof, wherein ends of each of said plurality of seal ring pieces have a stepped portion and are positioned such that opposing ends of adjacent seal ring pieces form split planes, all of the split planes being aligned in a same direction, and said plurality of seal ring pieces being slidable with respect to each other along the split planes;
   a plurality of springs, each of said plurality of springs being interposed between an adjacent pair of stepped portions of seal ring pieces of said plurality of seal ring pieces, said plurality of springs being expandable and contractible in the same direction as the split planes; and
   a plurality of seal ring guides, each of said plurality of seal ring guides engaging with one of said plurality of seal ring pieces and guiding said one of said seal ring pieces in the same direction as the split planes.

2. A seal ring according to claim 1, further comprising an additional plurality of springs, wherein said plurality of seal ring pieces comprises a first seal ring piece and a second seal ring piece opposite to said first seal ring piece, and each of said additional plurality of springs is interposed between one of said first and second seal ring pieces and a portion of a respective seal ring guide of said plurality of seal ring guides to allow said first and second seal ring pieces to move in the same direction as the split planes.

3. A seal ring comprising:

a plurality of seal ring pieces, each of said plurality of seal ring pieces having a seal fin located on an inner circumferential surface thereof, wherein ends of each of said plurality of seal ring pieces have a stepped portion and are positioned such that opposing ends of adjacent seal ring pieces form split planes, all of the split planes being aligned in a same direction, and said plurality of seal ring pieces being slidable with respect to each other along the split planes; and a plurality of springs, each of said plurality of springs being interposed between an adjacent pair of stepped portions of seal ring pieces of said plurality of seal ring pieces, said plurality of springs being expandable and contractible in the same direction as the split planes.

* * * * *